G. B. Isham's
Stove.

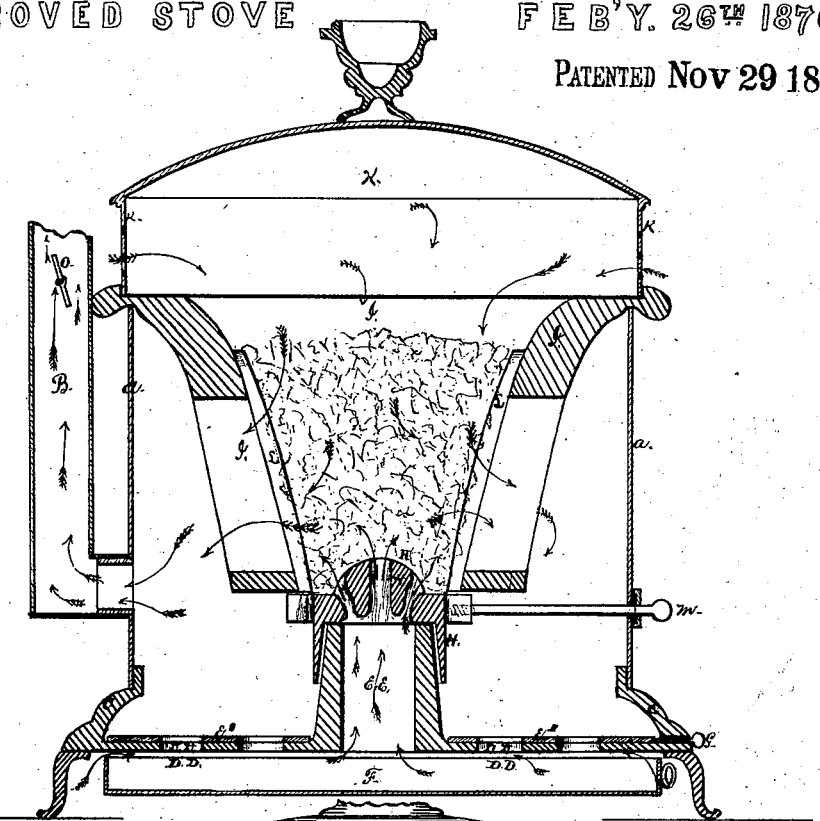
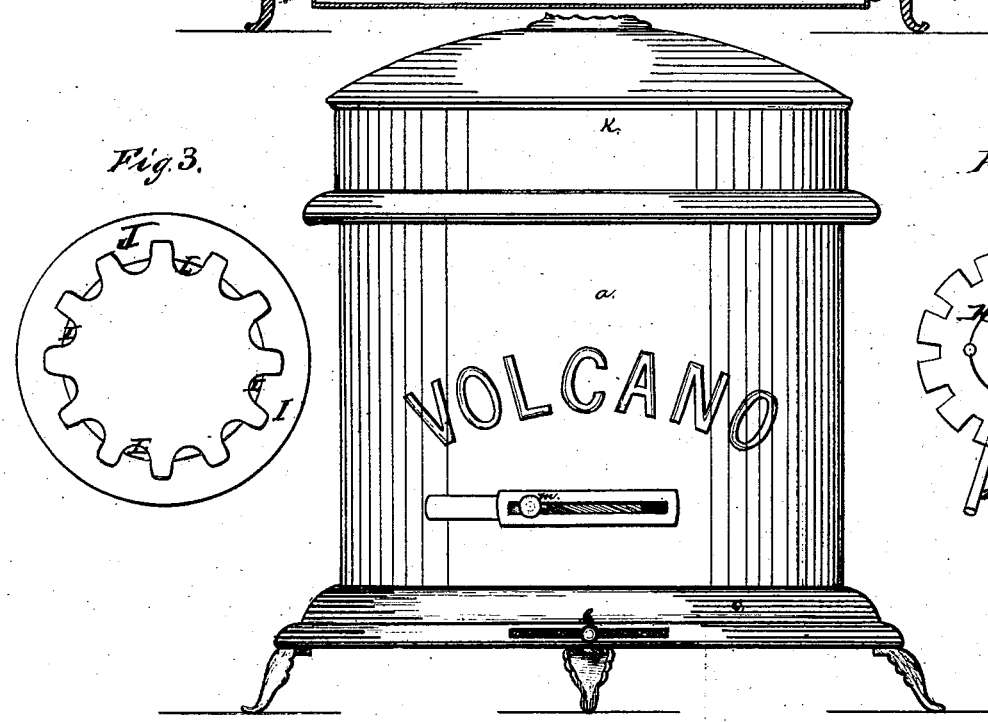
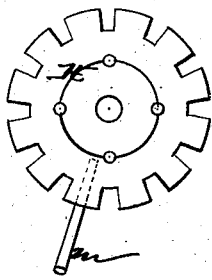

Witnesses.
Harry King
C. L. Smith

Inventor.
George B. Isham
her
Alexander Mason
Atty.

United States Patent Office.

GEORGE B. ISHAM, OF BURLINGTON, VERMONT.

Letters Patent No. 109,627, dated November 29, 1870; antedated November 17, 1870.

IMPROVEMENT IN HEATING-STOVES.

The Schedule referred to in these Letters Patent and making part of the same.

*To all whom it may concern:*

Be it known that I, GEORGE B. ISHAM, of Burlington, in the county of Chittenden and State of Vermont, have invented certain new and useful Improvements in Stoves; and do hereby declare the following to be a full, clear, and exact description thereof, reference being had to the accompanying drawing and to the letters of reference marked thereon.

The nature of my invention consists in the construction and arrangement of a stove, with upward and diving-draughts, so as to insure freedom from smoke, gas, dust, or any inconvenience from cooking of any kind, and also to give the greatest amount of heat by direct radiation from the fire itself, without said heat being obstructed by intervening metal.

In order to enable others skilled in the art to which my invention appertains to make and use the same, I will now proceed to describe its construction and operation, referring to the annexed drawing which forms a part of this specification, and in which—

Figure 5:
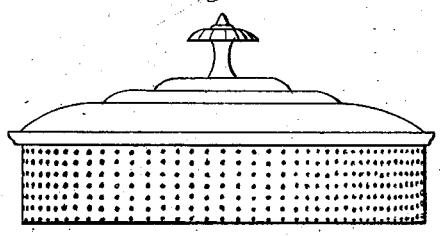
Figure 6:
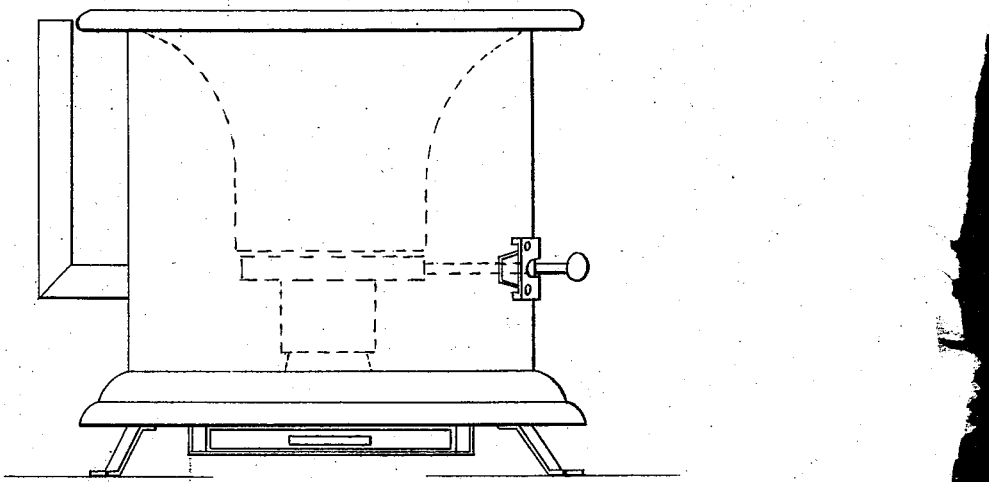

Figure 1 is a longitudinal vertical section, and
Figure 2, a front elevation of the stove.
Figure 3 is a view of the bottom of the fire-pot, and
Figure 4 is a plan view of the grate.
Figure 5 represents a view of the cap of the stove.
Figure 6 represents a view of the stove with the cap removed.

*a* represents the jacket or case, made of any desired metal, of circular, elliptical, or any other suitable form, and having a pipe, B, attached to it in the usual manner.

The jacket A is attached to the base C, which is provided with a perforated bottom, D, and hollow cone E, extending upward from the center.

On top of the perforated bottom D is placed a perforated circular plate, E', the cone E extending up through an aperture in the center of said plate.

The holes in the plate E' correspond with the holes in the bottom D, said plate and bottom being for the purpose of allowing ashes, at any time desired, to fall through and into the ash-receiver F underneath, the plate being operated by means of a lever, G, extending to the outside of the jacket or case A.

The grate H is placed on top of the cone E, and is, on its under side, provided with a circular flange, which extends down over the cone, for the purpose of insuring a steady motion while shaking.

In the center the grate H is bulged upward, as shown in fig. 1, and perforated, to admit a current of air from the hollow cone to pass upward to the fire-pot I.

The edge or circumference of the grate H is serrated, as shown in fig. 4, for the purpose of allowing the ashes from the fire-pot to more readily fall to the plate E', said grate being operated by means of a lever, *m*, which passes out through the case or jacket A.

The fire-pot I is cast or otherwise suitably made of metal, of circular form, with its sides pierced or slotted throughout its entire circumference, to allow gas and smoke to escape.

The fire-pot is open at the bottom, the grate H forming the bottom for the same.

The upper part of the fire-pot I extends over the upper edge of the jacket *a*, as a rest, and to support the cover or top of stove K.

On the inside of the fire-pot I are cast strengthening-bars L L, in any suitable manner to insure strength and durability.

The cover or top K is made in any desired form, and perforated, to admit of air passing through, to form the top draught.

The ash-receiver F is hung clear of the bottom D, to admit the under current or draught to pass between it and the bottom of the stove.

When the cover or cap K is removed, a great amount of heat is obtained by direct radiation, because the fire is entirely open, the diving-draught being sufficient to carry all the gases or smoke downward, and without any gas or smoke escaping into the room.

The cover is only used when rekindling the fire, or when long wood is burned.

The stove can be used for cooking, when the cover is removed, by placing the kettle or other vessel on top of the fire-pot, and it may also be used for heating irons.

The draught is readily regulated by the damper *o* in the pipe B.

Having thus fully described my invention,

What I claim as new, and desire to secure by Letters Patent, is—

1. The arrangement of the case *a*, pipe B, base C, perforated bottom D, and plate E', substantially as shown and described.

2. The combination of the base C, perforated bottom D, hollow cone E, and ash-receiver F, all constructed and arranged substantially as and for the purposes herein set forth.

3. In combination with the perforated bottom D and hollow cone E, the perforated plate E', operated by means of the lever G, substantially as and for the purposes herein set forth.

4. The grate H, constructed as described, with perforated bulge in the center, serrated edges, and a circular downwardly-projecting flange on its under side, said flange encircling the upper end of the hollow cone E, substantially as and for the purposes herein set forth.

5. The fire-pot I, constructed without a bottom, and having its sides pierced or slotted, and provided with strengthening-bars L L, in combination with the grate H, substantially as and for the purposes herein set forth.

6. The combination of the jacket or case A, base C, bottom D, plate E', cone E, grate H, fire-pot I, and cap K, all constructed and arranged to operate substantially as and for the purposes herein set forth.

GEO. B. ISHAM.

Witnesses:
 E. V. RYER,
 T. E. WALES.